United States Patent Office 3,154,583
Patented Oct. 27, 1964

3,154,583
STABILIZATION OF AROMATIC AMINES
Bernard A. Dombrow, Teaneck, and Siegfried Altscher, Union City, N.J., assignors to Nopco Chemical Company, Newark, N.J., a corporation of New Jersey
No Drawing. Filed Feb. 14, 1962, Ser. No. 173,118
9 Claims. (Cl. 260—578)

This invention relates to the stabilization of aromatic amines against degradation and/or deterioration.

It is well known that aromatic amines undergo degradation and/or deterioration upon storage and upon contact with air. For example, during treatments of the amine, e.g., during purifications, handling and storage, these amines have a tendency to darken in color, particularly when stored at elevated temperatures. As a result, the usefulness of the amine is reduced as, for instance, in the preparation of isocyanates by the phosgenation of the amine.

To overcome the foregoing shortcomings, it has been proposed to stabilize aromatic amines by incorporating therein the reaction product of thiourea and phenylenediamine (U.S. Patent No. 2,886,597), elemental sulfur (U.S. Patent No. 2,894,034), and stannous halides (U.S. Patent No. 2,971,029). The results of these stabilizers have not been entirely satisfactory. In each instance it is necessary to remove at some time the stabilizer since this represents a foreign ingredient in the amine. Attempts have been made to stabilize these amines by storing them under inert atmospheres such as nitrogen and hydrogen. Here too, the results have not been entirely satisfactory. Furthermore, the problem of stabilization is most acute in the case of mixtures of the isomers of toluene diamine. With regard to these mixtures, the deterioration occurs practically instantaneously upon exposure to the atmosphere, both at room temperature and at elevated temperatures and none of the procedures enumerated above has been found to be effective.

Accordingly, it is an object of this invention to provide for aromatic amines which are stabilized against degradation and/or deterioration on exposure to the atmosphere when handled or stored.

It is a further object of this invention to provide for stabilization of said amines both at room temperature and at elevated temperatures.

A further object is to provide for a new and improved process for stabilizing aromatic amines against degradation and/or deterioration on exposure to the atmosphere when handled or stored, both at room temperature and at elevated temperatures.

Further objects will become apparent from the detailed description given hereinafter. It is intended, however, that the detailed description and specific examples do not limit the invention, but merely indicate preferred embodiments thereof since various changes and modifications within the scope of the invention will become apparent to those skilled in the art.

It has been unexpectedly discovered that the above as well as other objects have been successfully achieved by surrounding or enveloping an aromatic amine or mixtures thereof with an atmosphere of carbon monoxide. In this manner, the aromatic amine or mixtures thereof is stabilized to a greater extent than heretofore achieved. Stabilization according to this invention has been found to be very effective when the amine is stored at room temperature as well as elevated temperatures, such as when the amine is maintained in a molten condition. By utilizing an atmosphere of carbon monoxide, all exposed areas of the amine as well as any fissures existing in the solid amine or between the vessel and the amine are protected. This invention is also admirably suited for protecting the amine during purification and other treatments thereof. For example, an atmosphere of carbon monoxide can be maintained during distillation of the amine. Additionally, there is no need for carrying out separations, distillations and the like to remove the stabilizer before using the amine.

The amines which can be effectively stabilized by the present invention can be liquids or solids at room temperature or can be solids maintained in a molten condition by elevated temperatures. The nature or character of the substituents present in the amine is immaterial so long as no reaction occurs between the substituent and carbon monoxide. Illustrative of amines which can be effectively stabilized by the present invention are the following amines as well as mixtures thereof. These are not limiting, but are merely exemplary of the various amines to which this invention is applicable.

Aniline
o-, m- And p-toluidines
Xylidine
o-, m- And p-aminophenols
o-, m- And p-phenylenediamines
Benzidine
α-Naphthylamine
β-Naphthylamine
o-, m- And p-chloroanilines
2,4-toluenediamine
2,6-toluenediamine
Methylene-bis aniline
1-chloro-2,4-phenylenediamine
Diphenyl-3,3'-dimethyoxy-4,4'-diamine
1,3-phenylenediamine
Naphthalene 1,4-diamine
Naphthalene 1,5-diamine
Xylylene diamine
4,4',4''-triphenyl methane triamine
2,4,6-triaminotoluene
4-benzyl phenylamine
Benzene-1,3,5-triamine
Mixtures of 2,4- and 2,6-isomers of toluene diamine containing about 80% by weight of 2,4- and about 20% by weight of 2,6-isomers of toluene diamine;
Mixtures of 2,4- and 2,6-isomers of toluene diamine containing about 65% by weight of 2,4- and about 35% by weight of 2,6-isomers of toluene diamine;
Mixtures of 2,4- and 2,6-isomers of toluene diamine containing about 95% by weight of 2,4- and about 5% by weight of 2,6-isomers of toluene diamine;
Mixtures of toluene diamines obtained from the catalytic hydrogenation of commercially available mixed dinitrotoluenes having the following composition:

3,5- and 3,4-dinitrotoluene _____ 1.2% by weight maximum.
2,3- and 3,4-dinitrotoluene _____ 4.8% by weight maximum.
Mononitrotoluene ____ 0.5% by weight maximum.
Trinitrotoluene _____ 0.2% by weight maximum.
Dinitrobenzene _____ 0.2% by weight maximum.
Other nitro compounds_ 0.2% by weight maximum.
Combined 2,4- and 2,6-dinitrotoluenes [1] ___ 97% by weight minimum.

[1] Present in a ratio of 79% to 81% by weight of 2,4-dinitrotoluene and 19% to 21% by weight 2,6-dinitrotoluene.

It must be recognized that these amines are susceptible to atmospheric oxidation and deterioration during storage to different extents and at different rates, depending upon the nature of the amine. Thus, some amines undergo a slower oxidation or deterioration than others. Hence, with some amines the improvement achieved by utilizing carbon monoxide will not appear striking, although when compared with prior art stabilizers, it will demonstrate a vast improvement. In the case of the stabilization of mixtures of the isomers of toluene diamine, the improvement afforded by the present invention is most striking when compared with the use of other stabilizers.

In order to more fully illustrate the present invention, the following examples are set forth. These examples which include accelerated tests at elevated temperatures are not to be construed in a limiting fashion.

EXAMPLE I

A. *Distillation and Storage at Room Temperature Under Nitrogen*

A 1000 gram batch of mixed toluene diamines obtained by the catalytic hydrogenation of mixed dinitro toluenes containing:

| | Percent by wt. |
|---|---|
| 2,4-dinitrotoluene | 77.6 |
| 2,6-dinitrotoluene | 18.2 |
| 2,3- and 2,5-dinitrotoluene | 0.2 |
| 3,4- and 3,5-dinitrotoluene | 3.4 |
| Dinitrobenzene | 0.2 |
| Mononitrotoluene | 0.1 |
| Water | 0.3 | as determined by gas chromatographic analysis, was distilled using a short column at 155° C. under 10 mm. pressure. During the distillation, nitrogen was bled very slowly through a capillary into the distillation pot thereby maintaining a nitrogen atmosphere throughout. The distillate was a pale yellow solid having a freezing point of 80° C. to 81° C. The above material was stored at room temperature under a nitrogen atmosphere for 24 hours at which time slight discoloration was observed. The discoloration consisted of a black area which appeared on the surface of the material.

B. *Distillation and Storage at Elevated Temperatures Under Nitrogen*

Another 1000 gram batch of mixed toluene diamines obtained by the catalytic hydrogenation of mixed dinitro toluenes having approximately the same composition as indicated in part A above was distilled in the same manner as above under an atmosphere of nitrogen. The distillate, a pale yellow liquid in color, was stored as a liquid at 90° C. to 100° C. under a nitrogen atmosphere. At the end of eight hours, the liquid had turned black.

In the following examples, the above procedure was repeated upon different 1000 gram batches of toluene diamine having approximately the same composition as indicated in Example I A above. However, in each example a different atmosphere was used. The results obtained are set forth below.

EXAMPLE II

A. *Distillation and Storage at Room Temperature Under Hydrogen*

Upon distillation of the amine under a hydrogen atmosphere followed by storage at room temperature under a hydrogen atmosphere, incipient discoloration, as evidenced by the formation of small black specks, was observed on the surface of the amine at the end of 24 hours.

B. *Distillation and Storage at Elevated Temperatures Under Hydrogen*

Upon distillation of the amine under a hydrogen atmosphere followed by storage of the amine at 90° C. to 100° C. under a hydrogen atmosphere for eight hours, the color of the amine had changed from pale yellow to deep red brown.

EXAMPLE III

A. *Distillation and Storage at Room Temperature Under Carbon Monoxide*

After distillation of the amine under a carbon monoxide atmosphere and storage at room temperature for five days under a carbon monoxide atmosphere, only incipient discoloration was observed at the end of this period. That is, small black specks upon the surface of the amine were observed.

B. *Distillation and Storage at Elevated Temperatures Under Carbon Monoxide*

After distillation under carbon monoxide atmosphere and storage under a carbon monoxide atmosphere, at 90° C. to 100° C. for 24 hours, the color of the amine changed from pale yellow to pale amber.

A comparison of Examples I through III which include accelerated tests at elevated temperatures clearly demonstrate the outstanding stabilization achieved by utilizing a carbon monoxide atmosphere both at room temperature and at elevated temperatures.

EXAMPLE IV

A. *Distillation and Storage at Room Temperature Under Nitrogen*

A 100 gram batch of m-phenylene diamine, technical grade, was distilled in a nitrogen atmosphere at 5 mm. pressure to yield 85.5 grams of m-phenylene diamine, a white solid. This distilled material was stored at room temperature under a nitrogen atmosphere. After 120 hours, the m-phenylene diamine had turned yellow. After 240 hours, it had turned dark brown.

B. *Distillation and Storage at Room Temperature Under Carbon Monoxide*

Another batch of technical grade m-phenylene diamine was similarly distilled yielding m-phenylene diamine as a white solid. However, this time distillation was carried out under a carbon monoxde atmosphere. The distilled material was stored at room temperature under a carbon monoxide atmosphere. After 240 hours, only very slight discoloration was observed. That is, the m-phenylene diamine had exhibited a very light yellow color.

Having described our invention, what we claim as new and desire to secure by Letters Patent is:

1. A stabilized carbocyclic aromatic amine consisting essentially of said amine enveloped by an atmosphere of carbon monoxide.

2. Stabilized toluene diamine consisting essentially of said amine enveloped by an atmosphere of carbon monoxide.

3. Stabilized amine consisting essentially of mixtures of isomers of 2,4-toluene diamine and 2,6-toluene diamine consisting essentially of said amine enveloped by an atmosphere of carbon monoxide.

4. Stabilized phenylene diamine consisting essentially of said amine enveloped by an atmosphere of carbon monoxide.

5. A method of stabilizing a carbocyclic aromatic amine consisting essentially of enveloping said amine in an atmosphere of carbon monoxide at temperatures between room temperature and the distillation temperature of said amine.

6. A method of stabilizing toluene diamine consisting essentially of enveloping said amine in an atmosphere of carbon monoxide at temperatures between room temperature and the distillation temperature of said amine.

7. A method of stabilizing a mixture of isomers of 2,4-toluene diamine and 2,6-toluene diamine consisting essentially of enveloping said mixture of isomers in an atmosphere of carbon monoxide at temperatures between room temperature and the distillation temperature of said amine.

8. A method of stabilizing phenylene diamine consisting essentially of enveloping said amine in an atmosphere of carbon monoxide at temperatures between room temperature and the distillation temperature of said amine.

9. A process for purifying and stabilizing a carbocyclic aromatic amine which comprises distilling said amine in the presence of an atmosphere of carbon monoxide and thereafter recovering and storing said amine under an atmosphere of carbon monoxide.

References Cited in the file of this patent

UNITED STATES PATENTS 1,947,578  Bond et al. _____ Feb. 20, 1934

OTHER REFERENCES

Gibbs: Chem. Abs., 1912 vol. 6, p. 599.

UNITED STATES PATENT OFFICE
CERTIFICATE OF CORRECTION

Patent No. 3,154,583              October 27, 1964

Bernard A. Dombrow et al.

It is hereby certified that error appears in the above numbered patent requiring correction and that the said Letters Patent should read as corrected below.

Column 2, lines 56 and 57, for "3,4-dinitrotoluene" read -- 2,5-dinitrotoluene --.

Signed and sealed this 15th day of March 1966.

(SEAL)
Attest:

ERNEST W. SWIDER             EDWARD J. BRENNER
Attesting Officer                Commissioner of Patents